July 14, 1953  R. H. MOSS  2,645,500
MATERIAL DISINTEGRATING AND DISTRIBUTING MACHINE
Filed March 2, 1950
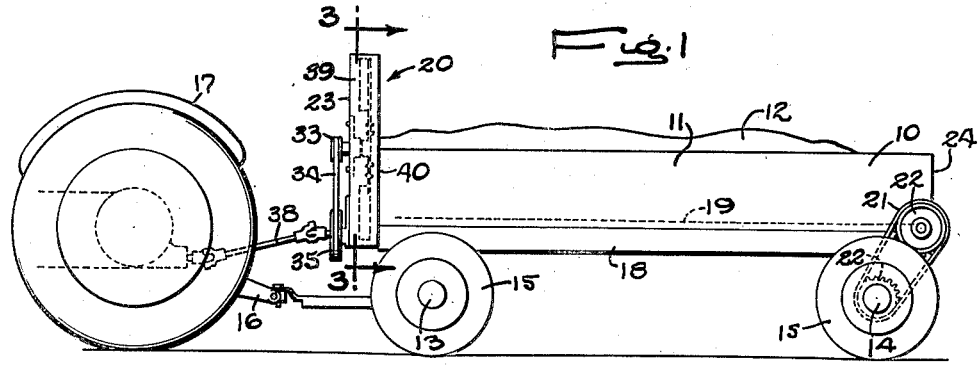
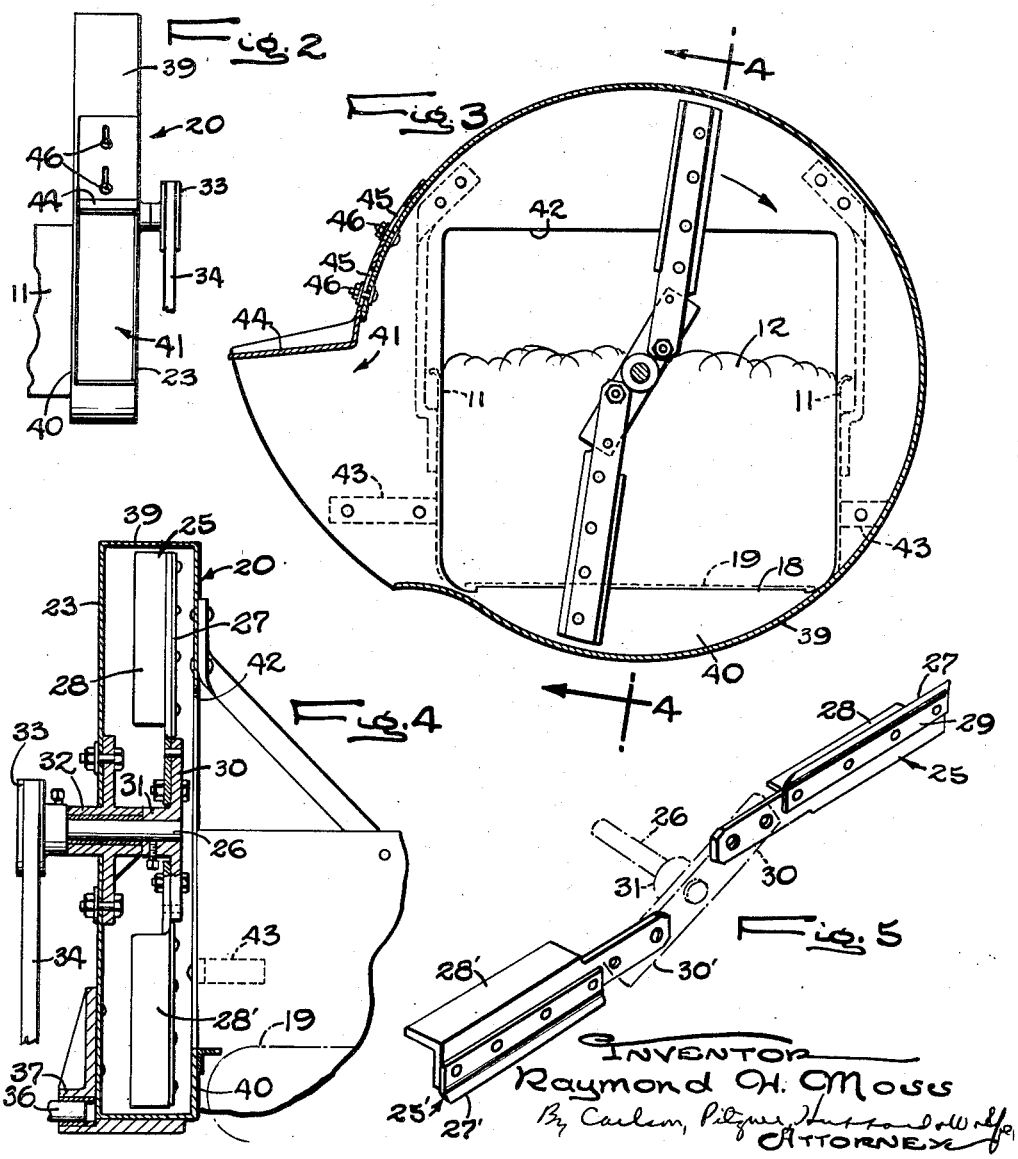
INVENTOR
Raymond H. Moss
ATTORNEY Patented July 14, 1953

2,645,500

UNITED STATES PATENT OFFICE 2,645,500

MATERIAL DISINTEGRATING AND DISTRIBUTING MACHINE

Raymond H. Moss, Freeport, Ill.; Edna B. Moss, executrix of said Raymond H. Moss, deceased Application March 2, 1950, Serial No. 147,287

4 Claims. (Cl. 275—6)

1

This invention relates to material spreading devices of the type adapted to cut or break up the material to be spread and throw the same outwardly away from a vehicle in which the material is carried.

The primary object of the invention is to provide a device of the above character which is simple and inexpensive to construct, in which the pattern of discharge of the material being spread may be easily controlled, and which is adapted to break up and distribute large pieces of material without becoming clogged or blocked.

A more detailed object is to break up the material into small pieces by cutting the same with a generally flat blade followed by a paddle which engages the material just after it is cut by the blade to throw the material outwardly away from the vehicle.

Other objects and advantages of the invention will become apparent from the following detailed description taken in connection with the accompanying drawings, in which Figure 1 is a side elevation of a material spreading device embodying the novel features of the present invention.

Fig. 2 is a fragmentary side elevation showing the side opening in the vehicle.

Fig. 3 is a sectional view taken along the line 3—3 of Fig. 1.

Fig. 4 is a fragmentary sectional view taken along the line 4—4 of Fig. 3.

Fig. 5 is a perspective view of the cutter blade.

In the drawings, the invention is shown for purposes of illustration incorporated in a material spreading device including an elongated wagon box 10 having upright side walls 11 and adapted to carry a quantity 12 of material such as manure to be spread over a field. The box is mounted on front and rear axles 13 and 14 having ground engaging wheels 15 thereon and is adapted at its front end to be connected to the draw bar 16 of a tractor 17. Supported on the floor 18 of the box is an endless conveyor 19 which is movable longitudinally of the box and engageable with the material 12 therein to move the latter toward one end of the box. The material is thus delivered into a mechanism, indicated generally at 20, for grinding or breaking up the material and throwing the same outwardly and sidewise from the box. While this mechanism may be located at the rear end of the wagon box, it is shown herein at the front end, and the conveyor is driven toward the same through a chain 21 and sprockets 22 from the rear axle 14.

2

End plates 23 and 24 join the side walls 11 of the box at opposite ends of the latter.

In accordance with the present invention, the grinding and throwing mechanism 20 is constructed and arranged in a novel manner with respect to the box 10 to insure that the material 12 will be divided finely and distributed evenly over the ground regardless of the size of the pieces of material fed into the mechanism. For this purpose, the grinding mechanism is in the form of an elongated generally flat blade 25 which is mounted on a shaft 26 for rotation at high speed in a plane parallel to and spaced from the front end plate 23. The leading edge 27 of the blade is sharpened to cut into and through the material fed toward the end plate. Following behind and rotatable with the blade is a paddle 28 which is disposed substantially at right angles to the plane of rotation of the blade and projects from the plane toward the front end plate. The paddle rotates in the space between the end plate and the plane of rotation of the blade to engage the material which has moved beyond the blade so as to throw the material outwardly and sidewise from the box.

Herein, the blade 25 is one leg of an elongated bar which is right angular in cross-section and the other leg of which forms a flange projecting laterally from the blade and constituting the paddle 28. A separate generally flat bar 29 is secured as by riveting to the blade and projects outwardly beyond the leading edge thereof to form the sharpened cutting edge 27. At its inner end, the blade is bolted to a radially extending arm 30 rigid with a sleeve 31 fast on the inner end of the shaft 26. The bar is disposed at a slight angle with respect to the arm and inclined rearwardly therefrom so that the cutting edge engages the material 12 with a shearing action. Preferably, a similar blade 25' constructed in the same way as the blade 25 and having a paddle 28' and cutting edge 27' thereon is bolted to an arm 30' on the sleeve 31 so as to project from the shaft in a direction opposite to the blade 25. To cover the maximum area at the end of the box, each blade extends a substantial distance below the bottom 18 of the box so that the outer ends of the blades swing past the lower corners of the box.

The shaft 26 extends longitudinally of the box 10 and, herein, is journaled in a bearing 32 secured to the front end plate 23. Secured to the outer end of the shaft and coacting with the sleeve 31 to prevent axial movement of the shaft with respect to the bearing is a pulley 33 which is driven through a belt 34 from a pulley 35 fast on a shaft 36. The latter is journaled in a bearing 37 on the lower part of the front end plate and is driven through a shaft 38 (see Fig. 1) and universal joints from the power take-off shaft of the tractor, the direction of rotation of the blade shaft 26 and the blades being clockwise as viewed in Fig. 3.

To control the pattern of distribution of the material 12 effectually and enable the latter to be thrown laterally away from the wagon box 10, the blades 25 and 25' are enclosed by a housing having a peripheral wall 39 which spans the front end plate 23 and an intermediate plate 40 parallel to the latter and which completely surrounds the blades except for an elongated lateral opening 41 in one side of the peripheral wall. The opening is disposed closely adjacent the end plate on the inner side of the latter and in the plane of rotation of the blades and is formed in a part of the peripheral wall which, in effect, forms a continuation of one of the side walls 11 of the box. As shown in Fig. 3, the opening or aperture 41 opens generally tangentially of the housing in the direction of advance of the knife blades 25 and 25' and is in the lower portion of the peripheral wall 39 where it is crossed by the paddles 28 and 28' as the latter move up so that the material cut by the blades is picked up by the paddles and immediately thrown laterally out through the aperture.

Herein, the front end and intermediate plates 23 and 40 are generally circular and the peripheral wall is cylindrical in shape, the wall being welded to the plates. A rectangular opening 42 in the intermediate plate opens into the wagon box 10 for the passage of the material 12 from the box into the housing and into engagement with the blades. The housing is supported on the box by brackets 43 secured at one end to the box side walls 11 and at the other end to the intermediate plate 40.

Further control of the pattern of distribution of the material 12 may be achieved by a deflector plate 44 extending outwardly from the peripheral wall 39 to define the upper end of the lateral opening 41 and engage the material as it is discharged from the box 10. In this instance, the plate is formed with slots 45 which receive bolts 46 projecting through the wall and permit adjustment of the plate relative to the wall to vary the size of the lateral opening.

In operation, assuming that the blades 25 and 25' are rotating at a high speed and that the box 10 is being pulled forwardly by the tractor, the material is moved by the conveyor 19 forwardly through the opening 42 in the intermediate plate 40 and into engagement with the blades. The material is cut by the leading edges 27 and 27' of the blades and passes beyond the latter into the path of the paddles 28 and 28' by which it is thrown radially of the shaft 26 and outwardly away from the box. Because the blades are enclosed except for the lateral opening 41, the material will be thrown from only one side of the box in a strip the width of which is determined by the position of the deflector plate 44 with respect to the peripheral wall 39.

It will be apparent that large pieces of the material may be divided finely by the grinding and throwing mechanism above described without the mechanism becoming clogged because there are no parts in which particles of the material may catch or pile up and because the blades rotate at a high speed and engage the material with a cutting action as distinguished from a clawing action. By extending the paddles 28 and 28' at right angles to the plane of rotation of the blades, the paddle motion is used most effectively in throwing the material outwardly away from the box.

I claim as my invention:

1. The combination of, an elongated wagon box open at one end, a housing enclosing said open end of said box and comprising spaced upright parallel plates mounted on the box and joined together by a peripheral wall extending longitudinally of the box and having a side opening therein, the inner one of said plates having an opening therein facing longitudinally of the box to receive material from the latter, a blade having a leading cutting edge and mounted on said housing for rotation within the latter in a plane parallel to said plates and about an axis extending longitudinally of the box, a conveyor supported for movement along said box toward said housing to transfer material from the box through said inner plate opening and into engagement with said blade, a flange projecting laterally from said blade toward said outer plate at a point spaced so as to trail behind said cutting edge and engage the material cut thereby to throw the same outwardly through said side opening and laterally away from said box, and a deflector plate projecting outwardly from said peripheral wall to define the upper end of said side opening and adjustably mounted on the wall to vary the size of the opening and control the pattern of distribution of said material.

2. The combination of, an elongated wagon box open at one end, a housing enclosing said open end of said box and comprising spaced parallel plates mounted on the box and joined together by a peripheral wall extending longitudinally of the box and having a side opening therein, the inner one of said plates having an opening therein facing longitudinally of the box to receive material from the latter, a blade having a leading cutting edge and mounted on said housing for rotation within the latter in a plane parallel to said plates and about an axis extending longitudinally of the box, a conveyor supported for movement along said box toward said housing to transfer material from the box through said inner plate opening and into engagement with said blade, and a flange projecting laterally from said blade toward said outer plate at a point spaced so as to trail behind said cutting edge and engage the material cut thereby to throw the same outwardly through said side opening and away from said box.

3. A material disintegrating device for use with a wagon box and having, in combination, a housing adapted to be mounted at one end of the box and comprising spaced vertical plates joined together by a peripheral wall extending between said plates and having a generally horizontal side aperture disposed in the lower portion thereof, one of said plates having an opening therein adapted to receive material moved endwise along the box, a generally flat blade disposed within said housing in a plane parallel to said plates and mounted for rotation about an axis extending perpendicularly to said plane, said blade having a leading cutting edge extending outwardly from said axis to cut material delivered into the housing through the opening in said one plate, a paddle disposed between the other of said plates and the plane of said blade and extending outwardly from said axis substantially through the length of said cutting edge, and means rigidly supporting said paddle for rotation with said blade with the paddle juxtaposed with the blade and trailing said cutting edge to engage and pick up material cut by each longitudinal portion of the blade whereby to continue the circumferential movement of the cut material, said aperture opening generally tangentially in the direction of advance of said blade and disposed adjacent said paddle as the latter moves upwardly to permit the paddle as it moves across said aperture to throw the material by centrifugal action laterally of said housing and out through the aperture.

4. The combination of, an elongated wagon box, a housing disposed at one end of said box and having a generally vertical plate at the outer end thereof extending transversely of the box, said housing having an opening at its inner end to permit material to be advanced from said box into said housing and including a peripheral wall extending inwardly from said plate, a generally flat blade mounted on said box adjacent but spaced from the inner side of said plate for rotation about an axis extending longitudinally of the box and having a leading cutting edge extending outwardly from said axis in a plane normal to the same, means defining a generally horizontal aperture in the side of said peripheral wall and in the lower portion of the same, a conveyor supported on the bottom of said box for endwise movement along the latter to engage material therein and transfer the same toward said plate and into engagement with said blade, a paddle disposed between said plate and the plane of said cutting edge and extending outwardly from said axis substantially through the length of said cutting edge, and means rigidly supporting said paddle for rotation with said blade and with the paddle juxtaposed with the blade and trailing said cutting edge to engage and pick up the material cut by each longitudinal portion of the blade whereby to continue the circumferential movement of the cut material, said aperture opening generally tangentially in the direction of advanec of said blade and disposed adjacent said paddle as the latter moves upwardly to permit the paddle as it moves across said aperture to throw the material by centrifugal action laterally of said box and out through the aperture.

RAYMOND H. MOSS.

References Cited in the file of this patent

UNITED STATES PATENTS

| Number | Name | Date |
|---|---|---|
| 891,299 | Smith | June 23, 1908 |
| 1,524,887 | Ronning et al. | Feb. 3, 1925 |
| 2,296,474 | Kucera | Sept. 22, 1942 |
| 2,327,893 | Hobson | Aug. 24, 1943 |